(12) United States Patent
Fan et al.

(10) Patent No.: US 7,822,906 B2
(45) Date of Patent: Oct. 26, 2010

(54) DATA FLUSH METHODS

(75) Inventors: Jin Fan, Taipei (TW); Xiaohua Xu, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 113 days.

(21) Appl. No.: 12/181,616

(22) Filed: Jul. 29, 2008

(65) Prior Publication Data
US 2009/0037636 A1 Feb. 5, 2009

(30) Foreign Application Priority Data
Jul. 30, 2007 (CN) .................. 2007 1 0143702
Jul. 30, 2007 (TW) .................. 96127719 A

(51) Int. Cl.
*G06F 13/36* (2006.01)
*G06F 5/00* (2006.01)
*G06F 13/00* (2006.01)

(52) U.S. Cl. .................. 710/310; 710/52; 710/57; 710/110; 710/306

(58) Field of Classification Search .................. 710/52, 710/57, 110, 306, 310, 311, 313; 711/135, 711/144
See application file for complete search history.

(56) References Cited

U.S. PATENT DOCUMENTS

| | | | | |
|---|---|---|---|---|
| 5,535,341 A | * | 7/1996 | Shah et al. .................. | 710/310 |
| 5,717,873 A | * | 2/1998 | Rabe et al. .................. | 710/110 |
| 5,983,304 A | * | 11/1999 | Jin .................. | 710/310 |
| 6,070,215 A | * | 5/2000 | Deschepper et al. .................. | 710/309 |
| 6,405,276 B1 | * | 6/2002 | Chen et al. .................. | 710/310 |
| 6,513,090 B1 | * | 1/2003 | Jeddeloh .................. | 710/310 |
| 6,553,430 B1 | * | 4/2003 | Keller .................. | 710/5 |
| 7,234,030 B1 | * | 6/2007 | Gupta et al. .................. | 711/154 |
| 2005/0122982 A1 | * | 6/2005 | Li et al. .................. | 370/395.41 |

FOREIGN PATENT DOCUMENTS

CN         1365060 A     8/2002

* cited by examiner

*Primary Examiner*—Thomas J Cleary
(74) *Attorney, Agent, or Firm*—Thomas, Kayden, Horstemeyer & Risley

(57) ABSTRACT

A bridge capable of preventing data inconsistency without degrading system performance is provided, in which a buffering unit comprises a plurality of buffers, a first master device outputs a flush request to flush the buffering unit, and a flush request control circuit records the flushed buffer(s) in the buffering unit when receiving the flush request and outputs a flush acknowledge signal to indicate to the first master device that the buffering unit has been flushed when all the plurality of buffers have been flushed once after the flush request has been received.

15 Claims, 7 Drawing Sheets

DATA FLUSH METHODS

CROSS REFERENCE TO RELATED APPLICATIONS

This Application claims priority of Taiwan Patent Application No. 96127719, filed on Jul. 30, 2007 and that of China Patent Application No. 200710143702.5, filed on Jul. 30, 2007, the entirety of which is incorporated by reference herein.

BACKGROUND OF THE INVENTION

1. Field of the Invention

The invention relates to data flush methods, and more particularly, to data flush methods capable of preventing data inconsistency.

2. Description of the Related Art

Many computer systems incorporate at least two buses, one is commonly referred to as a memory bus for communication between a central processor and a main memory, and the other is known as a peripheral bus for communication between peripheral devices, such as graph systems, disk drives or local area networks (LAN). To allow data transfer between the two buses, a bus bridge is utilized to "bridge" and couple the two buses together.

The primary task of a bridge is to allow data to cross from one bus to the other bus without diminishing the performance of either bus. To perform this function, the bridge must understand and participate in the bus protocol of each of the buses. In particular, the bridge must be able of serve in both a slave capacity and a master capacity, such that it can accept a request from a first bus as a slave, then initiate an appropriate bus operation on the other bus as a master. The bridge must, therefore, provide support for access crossing from one bus to the other bus.

Typically, a bridge utilizes data buffering such that data to be transferred through the bridge from either the memory bus or the peripheral bus is temporarily stored, or "posted", within a data buffer. Posting data in a bridge can enhance the performance of the system by packetizing data and pre-fetching data, but can also introduce a problem of data consistency when synchronization events occur. When a synchronization event occurs and data remains posted in the bridge, data inconsistency may occur.

BRIEF SUMMARY OF THE INVENTION

Embodiments of a bridge are provided, in which a buffering unit comprises a plurality of buffers and a first master device outputs a flush request to flush the buffering unit. A flush request control circuit records the flushed buffer(s) in the buffering unit in response of the flush request and outputs a flush acknowledge signal to indicate to the first master device that the buffering unit has been flushed in response of that all the plurality of buffers have been flushed after the flush request has been received.

The invention provides an embodiment of a flush request control circuit for generating a flush acknowledgement signal. The flush acknowledgement signal represents that all buffers in a buffering unit have been flushed according to a flush request. The flush request control circuit comprises a plurality of detection units, wherein each is correspondingly coupled to one of the buffers, and each detection unit outputs a flush validation signal according to the flush request and the a corresponding idle signal from the corresponding buffer, to represent that the corresponding buffer has been flushed after the flush request has been received. An output unit generates the flush acknowledge signal in response of that all the detection units output the flush validation signal.

The invention provides an embodiment of a flush method adapted for flushing a buffering unit comprising a plurality of buffers of an electronic system according to a flush request, in which it is detected whether buffers of the buffering unit have been flushed. Additionally, the flushed buffer(s) is recorded according to the flush request from a first master device, and a flush acknowledge signal is outputted to the first master device in response of that all the buffers have been flushed after the flush request has been received.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
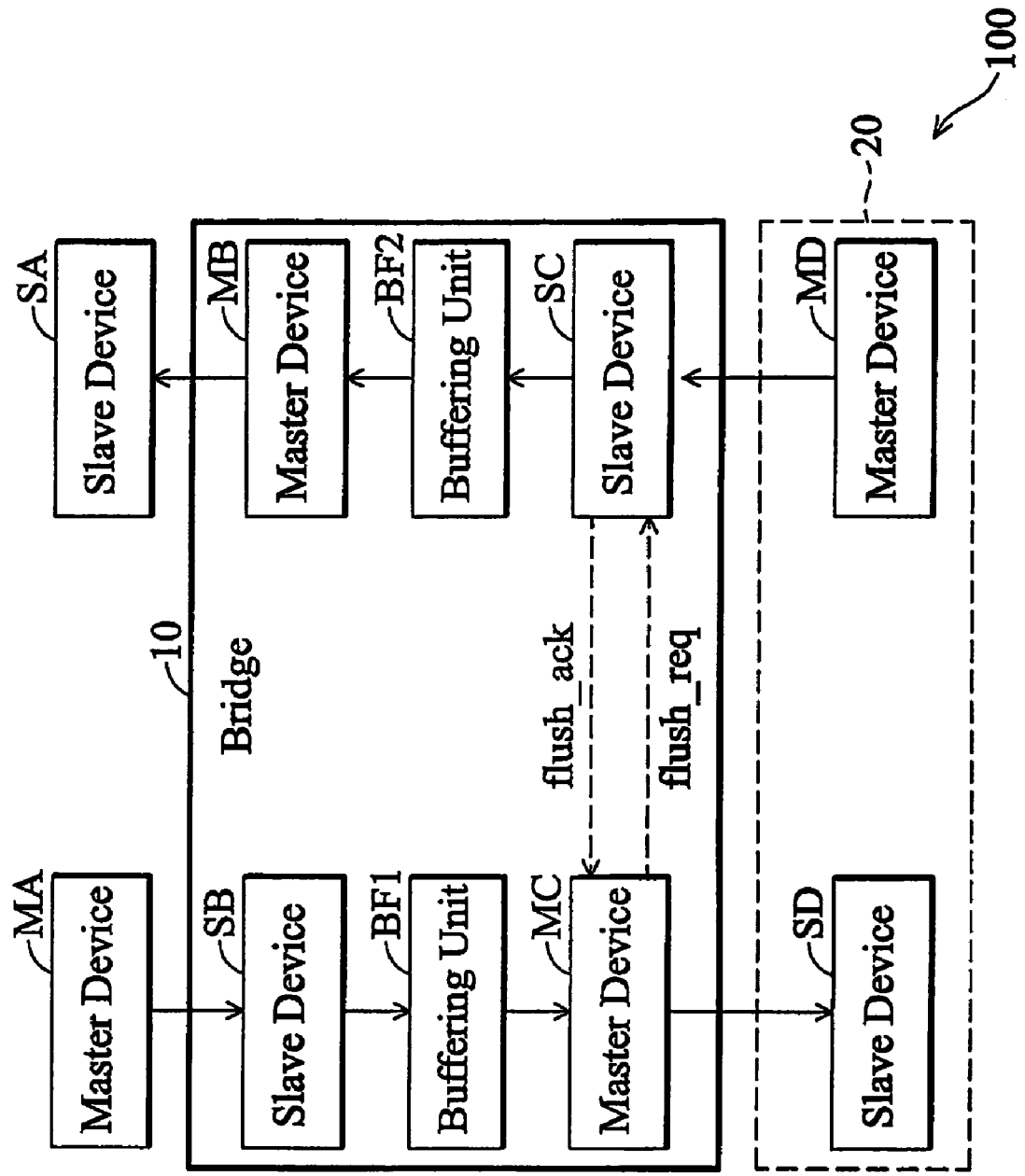
FIG. 1 shows an embodiment of an electronic system.

FIG. 1 shows an embodiment of an electronic system. As shown, the electronic system 100 can not only be implemented as a computer system but also a digital camera, a digital recorder, a consumer electronics, a mobile communication device, a portable electronic device or a robot, but is not limited thereto. The electronic system 100 comprises a master device MA, a slave device SA, a bridge 10 and a peripheral device 20. For example, the master device MA can be a central processing unit (CPU), the slave device SA can be a system memory or a cache memory of the CPU, the peripheral device 20 can be a peripheral component interface (PCI) apparatus, but is not limited thereto. The bridge 10 comprises master devices MB and MC, slave devices SB and SC, and buffering units BF1 and BF2. The peripheral device 20 comprises a master device MD and a slave device SD. For example, each of the buffering units BF1 and BF2 comprises one or more first in first output buffers (FIFOs).

When the master device MA requests to access the slave device SD in the peripheral device 20, the slave device SB receives transaction requests from the master device MA, and pushes the received transaction requests into the buffering unit BF1. The master unit MC executes the transaction requests pushed by the slave device SB in the buffering unit BF1, such that the slave device SD receives the transaction requests. On the contrary, when the master device MD in the peripheral device 20 requests to access the slave device SA, the slave device SC receives transaction requests from the master device SD and pushes the received transaction requests into the buffering unit BF2. The master device MB executes the transaction requests pushed by the slave device SC in the buffering unit BF2, such that the slave device SA receives the transaction requests. Generally, the transaction requests output to the slave device SD from the master device MA are referred to as downstream transactions, and the transaction requests output to the slave device SA from the master device MD are referred to as upstream transactions. In some examples, the transaction requests in one direction (downstream/upstream) must be complete before that in the other direction (upstream/downstream) are complete, to maintain order of the transaction requests and avoid data inconsistency problems.

For example, when completing a written transaction request, the peripheral device 20 asserts an interrupt signal to the master device MA, such as CPU, to indicate that the master device MA can read a written data from the slave device SA, such as system memory. The master MA outputs a read request to the slave device SD to read a status data of the peripheral device 20 before processing the written data in the slave device SA. Because the read request to the slave device SD from the master device MA is a synchronous event, the bridge 10 stops receiving new transaction requests from the master MD at this time, and flushes data stored in the buffering unit BF2 to guarantee data consistency.

Namely, the master device MA first reads the status data of the slave device SD, and the bridge 10 must guarantee that the written data has been pushed into the slave device SA before the transaction request is complete. Before the slave device SD reads data or the peripheral device 20 returns the status data to the master device MA, the bridge 10 generates a flush request flush_req to the slave device SC and waits for the slave device SC to reply with a flush acknowledge signal representing that the written data has been pushed into the slave device SA.

However, when receiving the flush request flush_req, the slave device SC does not push data or instructions into the buffering unit BF2, i.e., the slave device SC stops data and instruction transfer thereof and enables external master devices to retry transaction requests or assert waiting information to the external master devices. The slave device SC asserts the flush acknowledge signal flush_ack only when all transaction requests in the buffering unit BF2 have been flushed. Transaction requests can not be received when receiving the flush request flush_req, so that system performance is degraded.

Figure 2:
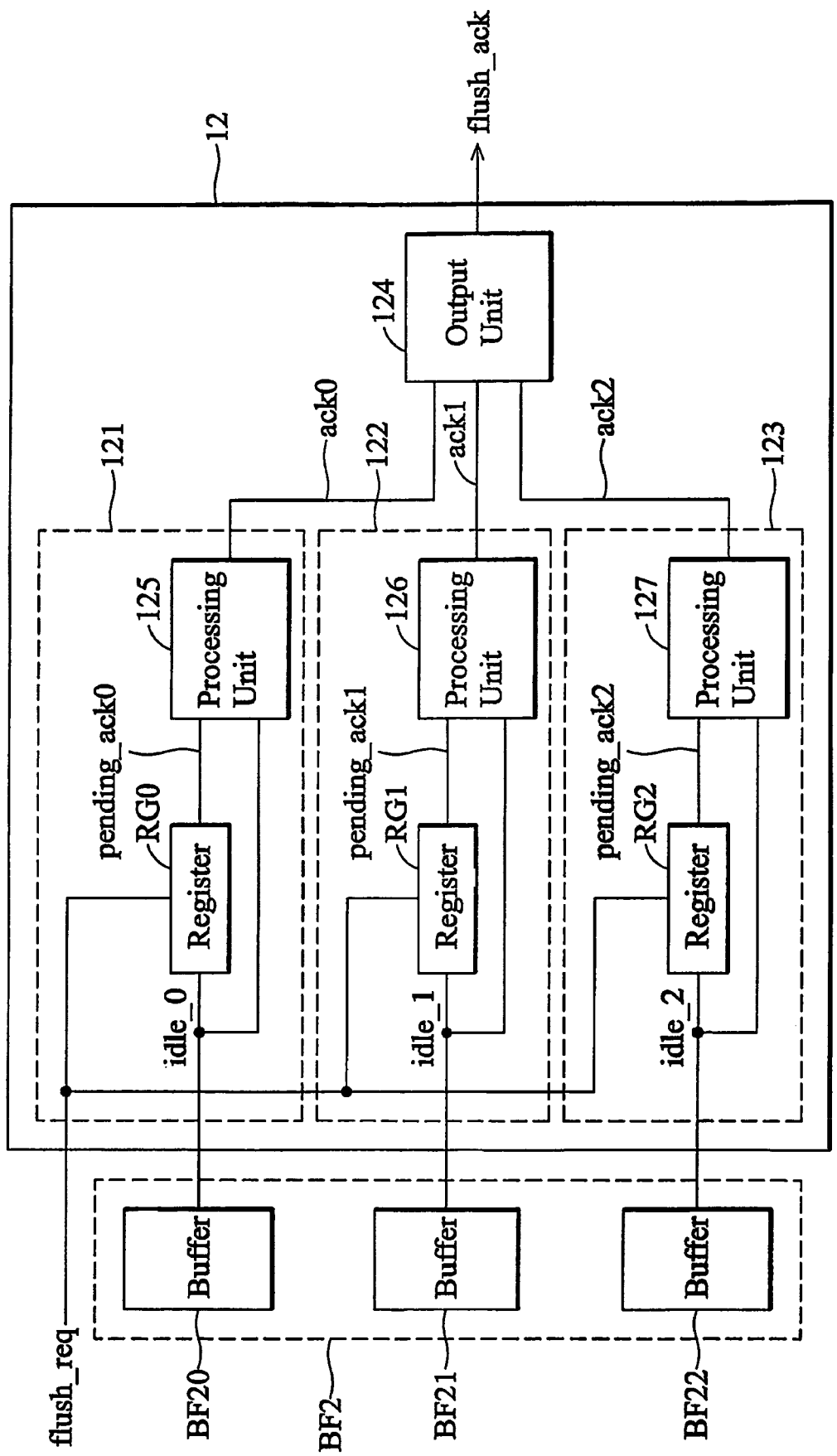
FIG. 2 shows an embodiment of a flush request control circuit according to the invention.

In order to improve system performance, the invention also provides other embodiments. FIG. 2 shows an embodiment of a flush request control circuit according to the invention. The flush request control circuit 12 can be disposed within the bridge 10 to detect whether N buffers in the buffering unit BF2 (i.e., BF20~BF21) are flushed and to record the flushed buffer(s) when receiving a flush request flush_req. When the N buffers have been flushed once after receiving the flush request flush_req, the flush request control circuit 12 outputs a flush acknowledge signal flush_ack to the master device MC. For example, the flush request control circuit 12 can be integrated into the slave device SC, and can also be disposed between the master device MC, the slave device SC and the buffering unit BF2, but is not limited thereto.

As shown in FIG. 2, the flush request control circuit 12 comprises detection units 121~123 and an output unit 124. The detection units 121~123 detect whether corresponding buffers BF20, BF21 and BF22 in the buffering unit BF2 have been flushed when receiving the flush request flush_req. The detection unit 121 comprises a register RG0 and a processing unit 125, the detection unit 122 comprises a register RG1 and a processing unit 126, and the detection unit 123 comprises a register RG2 and a processing unit 127.

For example, when all instructions or data stored in the buffers BF20, BF21 and BF22 are read or moved, the buffers BF20~BF22 are regarded as being flushed (i.e., idled or empty), and the idle signals idle_0, idle_1 and idle_2 of the buffers BF20~BF22 are set to logical high. When the idle signal idle_0 is set to logical high, the detection unit 121 detects that the buffer BF20 has been flushed. Similarly, when the idle signals idle_1 and idle_2 are set to logical high, the detection units 122 and 123 detect that the buffers BF21 and BF22 have been flushed.

In almost all cases, because the buffers BF20~BF22 are not idle at the same time, when receiving a logical high idle signal idle_0/idle_1/idle_2 from the corresponding buffer, the register RG0/RG1/RG2 of the embodiment stores the received idle signal idle_0/idle_1/idle_2 and generates a corresponding flush signal pending_ack0/pending_ack1/pending_ack2, thereby recording that the corresponding buffer BF20/BF21/BF22 has been flushed after receiving the flush request flush_req. At this time, the flushed buffer(s) has been/have been allowed to receive instruction(s) or data from the slave device SC in response to transaction(s) from the master device MD.

For example, when receiving a logical high idle signal idle_0 from the buffer, the registers RG0 stores the received idle signal idle_0 and asserts a corresponding logical high flush signal pending_ack0, to record that the corresponding buffer BF20 has been flushed after receiving the flush request flush_req. At this time, the bridge 10 allows the slave device SC to push instruction(s) or data into the flushed buffer BF20 according to transaction(s) from the master device MD. When the flush signal pending_ack0 is logical high, the processing unit 125 outputs a flush validation signal ack0 with logical high.

Similarly, when receiving a logical high idle signal idle_1 from the buffer BF21, the registers RG1 stores the received idle signal idle_1 and asserts a corresponding logical high flush signal pending_ack1, to record that the corresponding buffer BF21 has been flushed after receiving the flush request flush_req. At this time, the bridge 10 allows the slave device SC to push instruction(s) or data into the flushed buffer BF21 according to transaction(s) from the master device MD. When the flush signal pending_ack1 is logical high, the processing unit 126 outputs a flush validation signal ack1 with logical high. Operations of the register RG2 is similar to that of the registers RG0 and RG1, and thus are omitted.

The output unit 124 outputs the flush acknowledge signal flush_ack to the master device MC when the buffers BF20~BF22 have been flushed once, after the flush request flush_req has been received. For example, the output unit 124 outputs the flush acknowledge signal flush_ack to represent that the data (or instructions) in the buffering unit BF2 stored before receiving the flush request flush_req has been/have been flushed when the buffers BF20~BF22 have been flushed once after the flush request flush_req has been received (i.e., the idle signal idle_0~idle_2 all have been set to logical high).

Because the bridge 10 allows the buffers BF20~BF22 to receive new data or instructions from the slave device SC after the buffers BF20~BF22 are recorded as being flushed, the slave device SC does not need to stop receiving transaction(s) from the master device MD and continues pushing data or instruction(s) into the flushed buffer(s) in the buffering unit BF2 even if the flush request flush_req from the master device MC has been received. Thus, greatly improving system performance.

Figure 3:
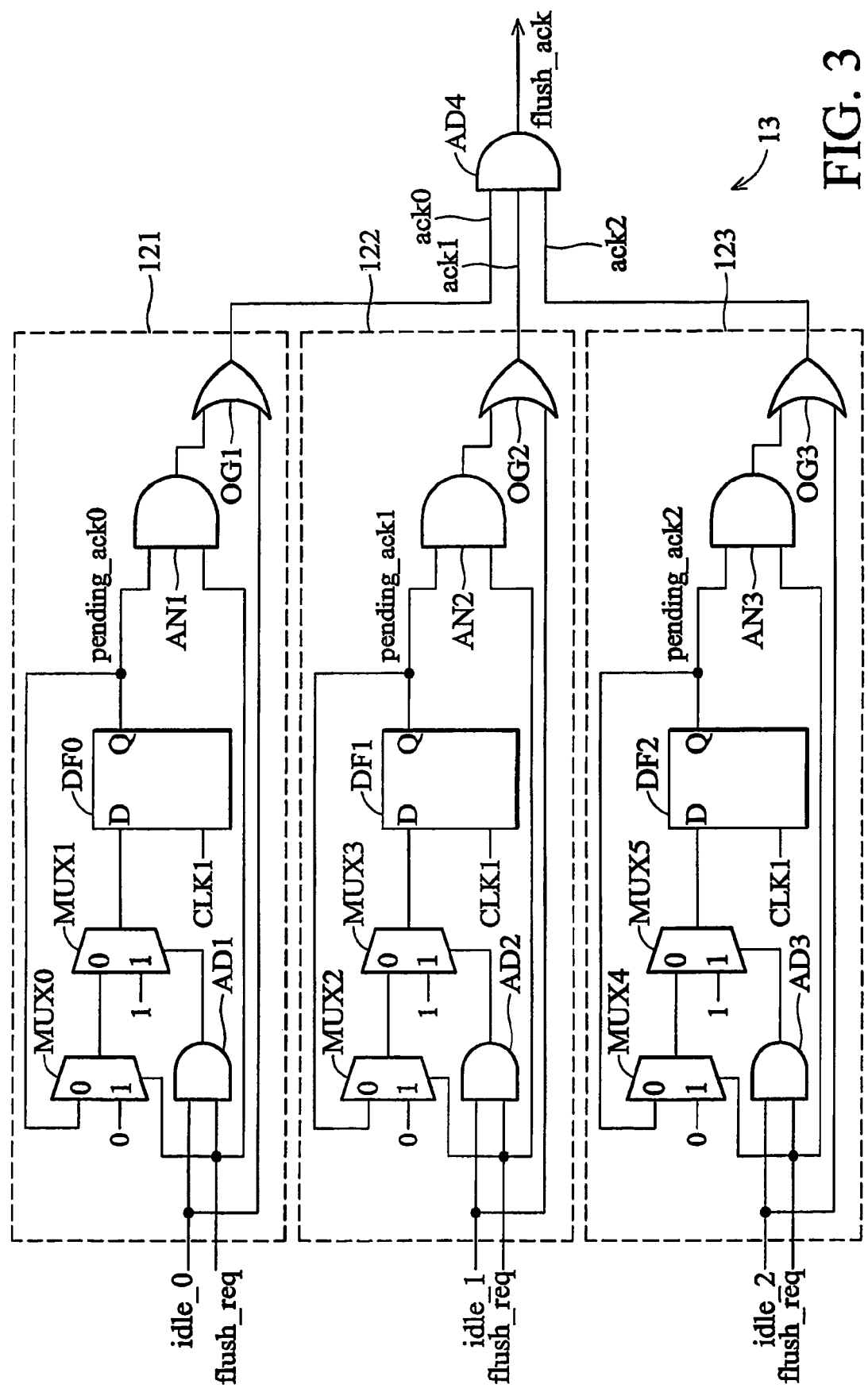
FIG. 3 shows a circuit diagram of the flush request control circuit shown in FIG. 2.

FIG. 3 shows another embodiment of the flush request control circuit according to the invention. As shown, the flush request control circuit 13 comprises detection units 121~123 and an AND gate AD4 serving as the output unit 124. Similarly, the flush request control circuit 13 can be integrated into the slave device SC, and can also be disposed between the master device MC, the slave device SC and the buffering unit BF2.

The AND gate AD1, the D-flip flop DF0 and the multiplexer MUX0~MUX1 in the detection unit 121 form the register RG0 shown in FIG. 2, and the AND gate AN1 and OR gate OG1 form the processing unit 125 shown FIG. 2. The AND gate AD1 comprises two input terminals coupled to the idle signal idle_0 from the buffer BF20 in the buffering unit BF2 and the flush request flush_req, respectively, and an output terminal coupled to the multiplexer MUX1. The multiplexer MUX0 comprises two input terminals coupled to the output terminal of the D-flip flop DF0 and data "0" (i.e., logical low), respectively. The multiplexer MUX1 comprises two input terminals coupled to the output terminal of multiplexer MUX0 and data "1" (i.e., logical high), respectively, and an output terminal coupled to the multiplexer MUX1. The D-flip flop DF0 comprises an input terminal coupled to the output terminal of the D-flip flop DF0, a clock input terminal coupled to a clock signal CLK1, and an output terminal outputting the flush signal pending_ack0 to input terminals of the AND gate AN1 and the multiplexer MUX0. Another input terminal of the AND gate AN1 is coupled to the flush request flush_req. The OR gate OG1 comprises two input terminals coupled to the output terminal of the AND gate AN1 and the idle signal idle_0 from the buffer BF20 in the buffering unit BF20, and an output terminal outputting the flush acknowledge signal flush_ack to the AND gate AD4. Structure of the detection units 122 and 123 is similar to that of the detection unit 121, and thus are omitted for brevity.

Figure 4:
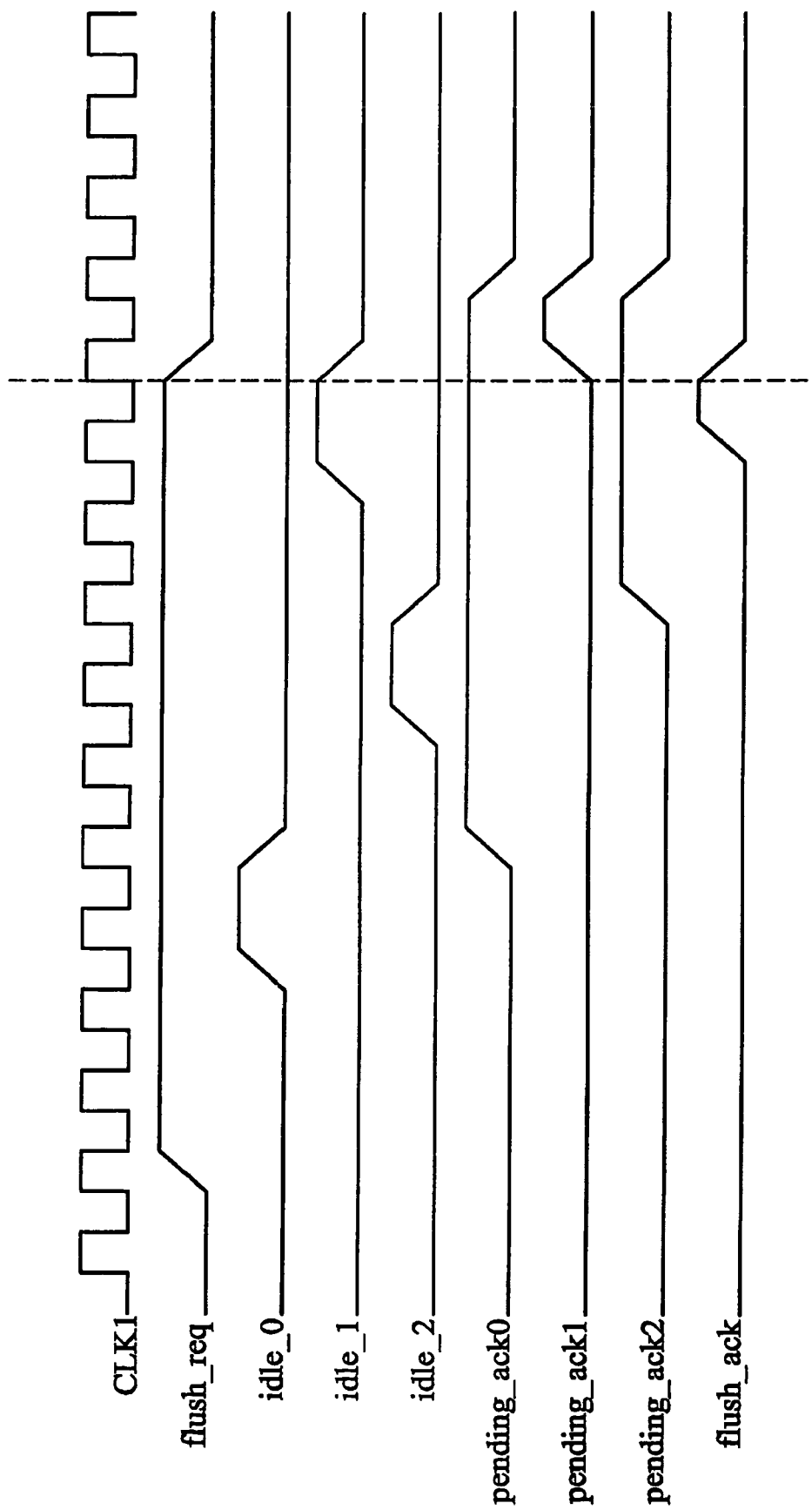
FIG. 4 is a timing chart of the flush request control circuit shown in FIG. 3.

Operations of the flush request control circuit 13 are illustrated with reference to FIG. 4. After the flush request flush_req has been received, the D-flip flop DF0 outputs the flush signal pending_ack0 when receiving the logical high idle signal idle_0, representing that the buffer BF20 has been flushed. For example, when the flush request flush_req and the idle signal idle_0 are logical high, the output terminal of the AND gate AD1 becomes logical high from logical low, such that a logical high signal (i.e. data "1") is outputted to the D-flip flop DF0 via the multiplexer MUX1. Accordingly, the output terminal of the D-flip flop DF0 becomes logical high from logical low (i.e., the flush signal pending_ack0 is outputted) to represent that the corresponding buffer has been flushed. Meanwhile, the logical high flush signal pending_ack0 is coupled to an input terminal of the multiplexer MUX1 via the multiplexer MUX0. Because the control terminal of the multiplexer MUX0 is coupled to the logical high flush request flush_req, the input terminals of the multiplexer MUX1 are both logical high, and thus, the output terminal of the D-flip flop DF0 is maintained at logical high (i.e., the flush signal pending_ack0) regardless of the output of the AND gate AD1. Namely, the flush request control circuit 13 records that the buffer BF20 has been flushed after the flush request flush_req has been received. Thus, even if the idle signal idle_0 becomes logical low from logical high because the slave device SC pushes data or instruction(s) into the buffer BF20, the flush signal pending_ack0 from the D-flip flop DF0 will still be maintained at logical high, and the AND gate AN1 outputs a logical high signal to the OR gate OG1, such that the OR gate OG1 continues outputting a flush validation signal ack0.

Similarly, the D-flip flop DF2 outputs the logical high flush signal pending_ack2, to represent that the flush request control circuit 13 has recorded that the buffer BF22 has been flushed after the flush request flush_req has been received. Hence, even if the idle signal idle_2 becomes logical low from logical high because the slave device SC pushes data or instruction(s) into the buffer BF22, the output of the D-flip flop DF2 (i.e., the flush signal pending_ack2) will still be maintained at logical high, such that the OR gate OG2 continues outputting a flush validation signal ack2.

When the logical high idle signal idle_1 is received, it means that the buffer BF21 has been flushed. Since the flush validation signal ack0 and ack2 are both logical high at this time, all the buffers BF20~BF22 are flushed after the flush request flush_req has been received, and thus, the output terminal of the AND gate AD4 becomes logical high from logical low (i.e., the flush acknowledge signal flush_ack is outputted to the master device MC). After the flush acknowledge signal flush_ack becomes logical high, the flush signals pending_ack0~pending_ack01 are cleared at a next clock period. For example, when the flush acknowledge signal flush_ack is logical high, the flush request flush_req is set to logical low, such that the multiplexer MUX0 outputs a logical low signal (i.e., data "0") to the multiplexer MUX1. Because the output terminals of the AND gate AD1 and the multiplexer MUX0 are both logical low at this time, the multiplexer MUX1 outputs a logical low signal (i.e., data "0") to the D-flip flip DF0, such that the output terminal of the D-flip flop DF0 becomes logical low from logical high. In the embodiment, because flush signals pending_ack0~pending_ack2 are cleared in the next period when the flush request flush_req becomes logical low, it prevents the flush request control circuit 13 to output unnecessary flush acknowledge signal flush_ack by the AND gate AN1.

Figure 5:
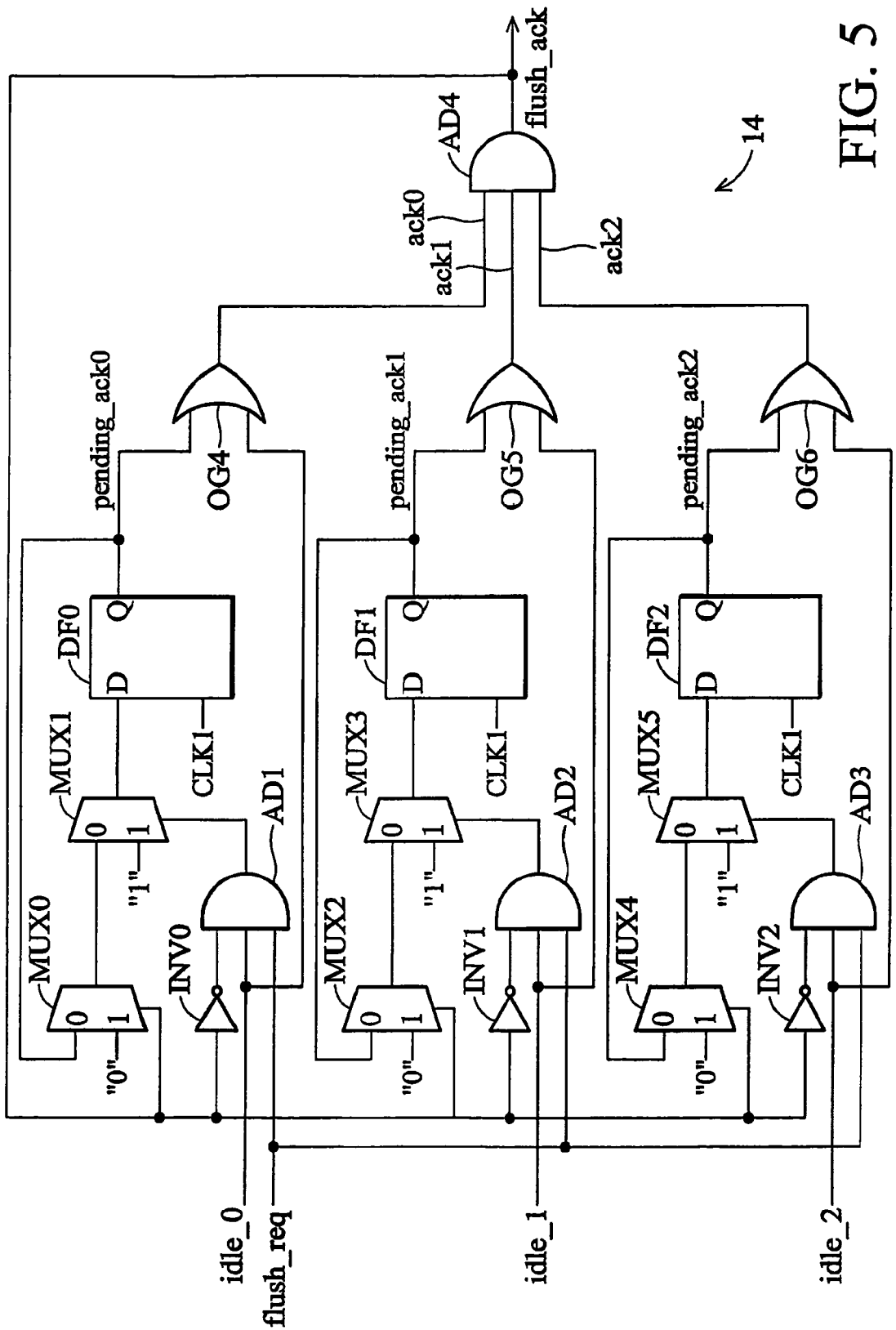
FIG. 5 shows another circuit diagram of the flush request control circuit shown in FIG. 2.

FIG. 5 shows another embodiment of the flush request control circuit. As shown, the flush request control circuit 14 comprises inverters INV0~INV2, AND gate AD1~AD4, multiplexers MUX0~MUX5, D-flip flops DF0~DF2, and OR gates OG4~OG6. Similarly, the flush request control circuit 14 can be integrated into the slave device SC, and can also be disposed between the master device MC, the slave device SC and the buffering unit BF2. For example, the inverters INV0, the AND gate AD1, the multiplexers MUX0~MUX1, the D-flip flop DF0 and the OR gate OG4 can form the detection unit 121 as shown in FIG. 2. The inverters INV1, the AND gate AD2, the multiplexers MUX2~MUX3, the D-flip flop DF1 and the OR gate OG5 can form the detection unit 122 as shown in FIG. 2. The inverters INV2, the AND gate AD3, the multiplexers MUX4~MUX5, the D-flip flop DF2 and the OR gate OG6 can form the detection unit 123 as shown in FIG. 2.

The AND gate AD1 comprises three input terminals coupled to an output terminal of the inverter INV0, the idle signal idle_0 from the buffer BF20 in the buffering unit BF2 and the flush request flush_req respectively, and an output terminal coupled to the multiplexer MUX1. The multiplexer MUX1 comprises two input terminals coupled to an output terminal of the multiplexer MUX0 and the data "1" (i.e., logical high), and an output terminal coupled to the D-flip flop DF0. The D-flip flop DF0 comprises an input terminal coupled to the output terminal of the multiplexer MUX1, a clock input terminal coupled to a clock signal CLK1, and an output terminal coupled to input terminals of the OR gate OG4 and the multiplexer MUX0.

The AND gate AD2 comprises three input terminals coupled to an output terminal of the inverter INV1, the idle signal idle_1 from the buffer BF21 in the buffering unit BF2 and the flush request flush_req, respectively, and an output terminal coupled to the multiplexer MUX3. The multiplexer MUX3 comprises two input terminals coupled to an output terminal of the multiplexer MUX2 and the data "1" (i.e., logical high), and an output terminal coupled to the D-flip flop DF1. The D-flip flop DF1 comprises an input terminal coupled to the output terminal of the multiplexer MUX3, a clock input terminal coupled to the clock signal CLK1, and an output terminal coupled to input terminals of the OR gate OG5 and the multiplexer MUX2.

The AND gate AD3 comprises three input terminals coupled to an output terminal of the inverter INV2, the idle signal idle_2 from the buffer BF22 in the buffering unit BF2 and the flush request flush_req, respectively, and an output terminal coupled to the multiplexer MUX5. The multiplexer MUX5 comprises two input terminals coupled to an output terminal of the multiplexer MUX4 and the data "1" (i.e., logical high), and an output terminal coupled to the D-flip flop DF2. The D-flip flop DF2 comprises an input terminal coupled to the output terminal of the multiplexer MUX5, a clock input terminal coupled to the clock signal CLK1, and an output terminal coupled to input terminals of the OR gate OG6 and the multiplexer MUX4.

The OR gate OG4 comprises two input terminals coupled to the output terminal of the D-flip flop DF0 and the idle signal idle_0 from the buffer BF20 in the buffering unit BF2, respectively. The OR gate OG5 comprises two input terminals coupled to the output terminal of the D-flip flop DF1 and the idle signal idle_1 from the buffer BF21 in the buffering unit BF2, respectively. The OR gate OG6 comprises two input terminals coupled to the output terminal of the D-flip flop DF2 and the idle signal idle_2 from the buffer BF22 in the buffering unit BF2, respectively. The AND gate AD4 comprises three input terminals coupled to output terminals of the OR gates OG4~OG6, and an output terminal coupled to input terminals of the inverters INV0~INV2.

Figure 6:
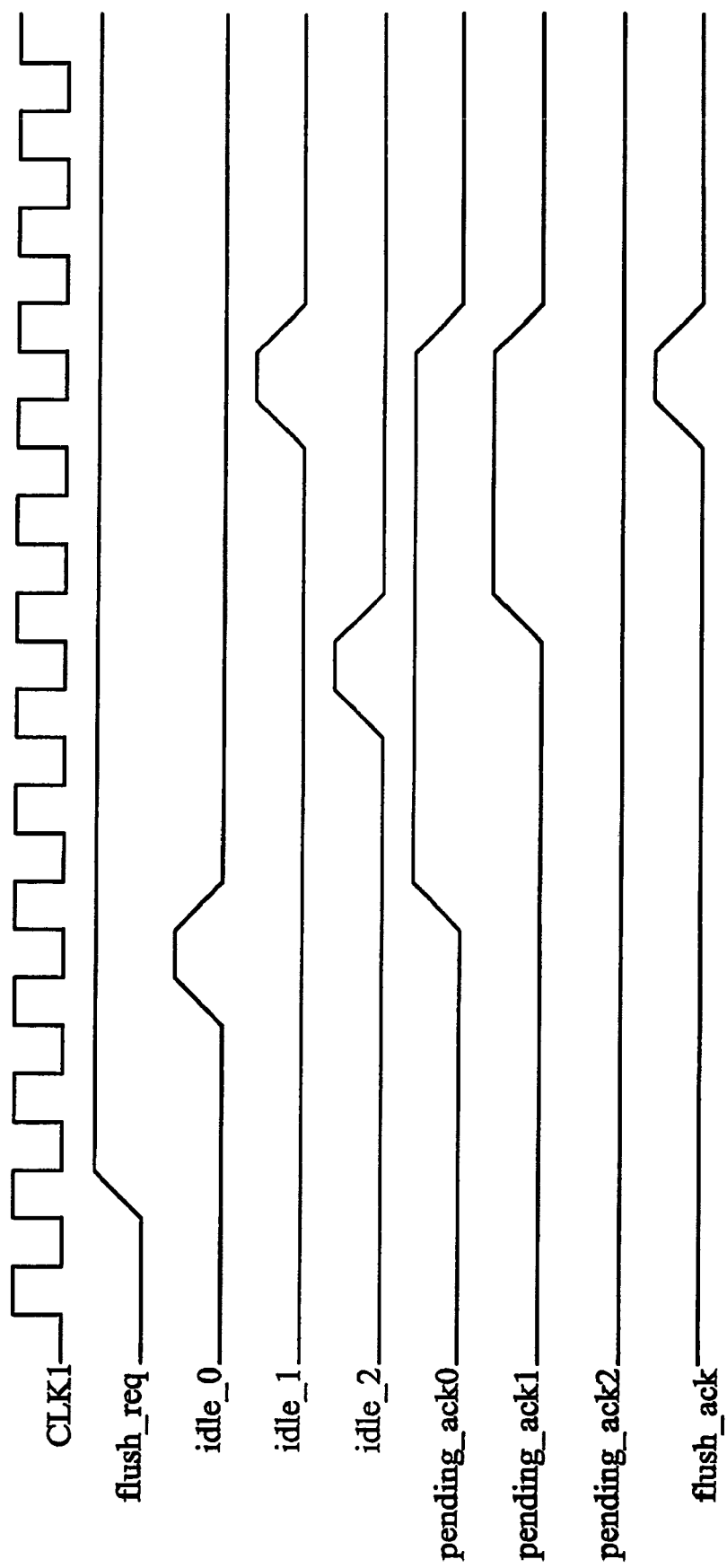
FIG. 6 is a timing chart of the flush request control circuit shown in FIG. 5.

Operations of the flush request control circuit 14 are illustrated with reference to FIG. 6. After the flush request flush req is received, the D-flip flop DF0 outputs the flush signal pending_ack0 when receiving the logical high idle signal idle_0, representing that the buffer BF20 has been flushed. For example, the output terminal of the inverter INV0 is at logical high because the flush acknowledge signal flush_ack is still maintained at logical low (i.e., is not asserted). Accordingly, when the flush request flush_req and the idle signal idle_0 are both logical high, the output terminal of the AND gate AD1 becomes logical high from logical low, such that a logical high signal (i.e., data "1") is outputted to the D-flip flop DF0 via the multiplexer MUX1. Hence, the output terminal of the D-flip flop DF0 becomes logical high from logical low to represent that the corresponding buffer BF20 has been flushed. Meanwhile, the logical high flush signal pending_ack0 is outputted to an input terminal of the multiplexer MUX0.

Because the two input terminals of the multiplexer MUX1 are both logical high, the output terminal of the D-flip flop DF0 (i.e., the flush signal pending_ack0) is maintained at logical high regardless of the output of the AND gate AD1. Namely, the flush request control circuit 14 has recorded that the buffer BF20 has been flushed after the flush request flush_ req has been received.

Thus, even if the idle signal idle_0 becomes logical low because the slave device SC pushes instruction(s) or data into the buffer BF20, the flush signal pending_ack0 from the D-flip flop DF0 is maintained at logical high, such that the OR gate OG4 continues outputting a flush validation signal ack0 with logical high.

Similarly, when the idle signal idle_2, representing that the buffer BF22 has been flushed is received, the D-flip flop DF2 outputs the flush signal pending_ack2 with logical high to represent that the flush request control circuit 14 has recorded that the buffer BF22 has been flushed after the flush request flush_req has been received. Thus, even if the idle signal idle_2 becomes logical low because the slave device SC pushes instruction(s) or data into the buffer BF22, the output of the D-flip flop DF2 (i.e., the flush signal pending_ack2) is maintained at logical high, such that the OR gate OG6 continues outputting a flush validation signal ack2 with logical high.

Namely, the buffer BF21 has been flushed when the idle signal idle_1 has been received. At this time, the flush validation signal ack0 and ack2 and the idle signal idle_1 are at logical high, which means that all buffers BF20~BF22 in the buffering BF2 has been flushed after the flush request flush_ req has been received, and thus, the output terminal of the AND gate AD4 becomes logical high from logical low (i.e., the flush acknowledge signal flush_ack is outputted to the master device MC). The flush signals are cleared (reset) after the flush acknowledge signal flush_ack becomes logical high. For example, when the flush acknowledge signal flush_req is at logical high and the output terminals of the AND gate AD1 and the multiplexer MUX0 are at logical low, the multiplexer MUX1 outputs a logical low signal (i.e., data "0") to the D-flip flop DF0, such that the flush signal pending_ack0 from the D-flip flop DF0 is cleared (i.e., becomes logical low from logical high).

In fact, the inverters INV0~INV2 in the flush request control circuit 14 can be omitted, i.e., the AND gates AD1~AD3 each comprises two input terminals coupled to the flush request flush_req and the corresponding idle signal idle_0~idle_2 respectively, rather than three input terminals. However, when the flush acknowledge signal flush_ack and the flush request flush_req are both at logical high, the multiplexer (such as MUX1) and a corresponding D-flip flop DF0 causes an unnecessary operation when responding to the output from the AND gate AD1. In order to prevent the unnecessary operation, the flush request flush_req can be set at logical low by the master device MC when the flush acknowledge signal flush_ack is at logical high.

In this embodiment, the slave device SC does not need to stop receiving transaction requests from the master device MD and continues pushing data or instruction(s) into the buffering unit BF2, even if the flush request flush_req has been received. Thus, greatly improving system performance.

Figure 7:
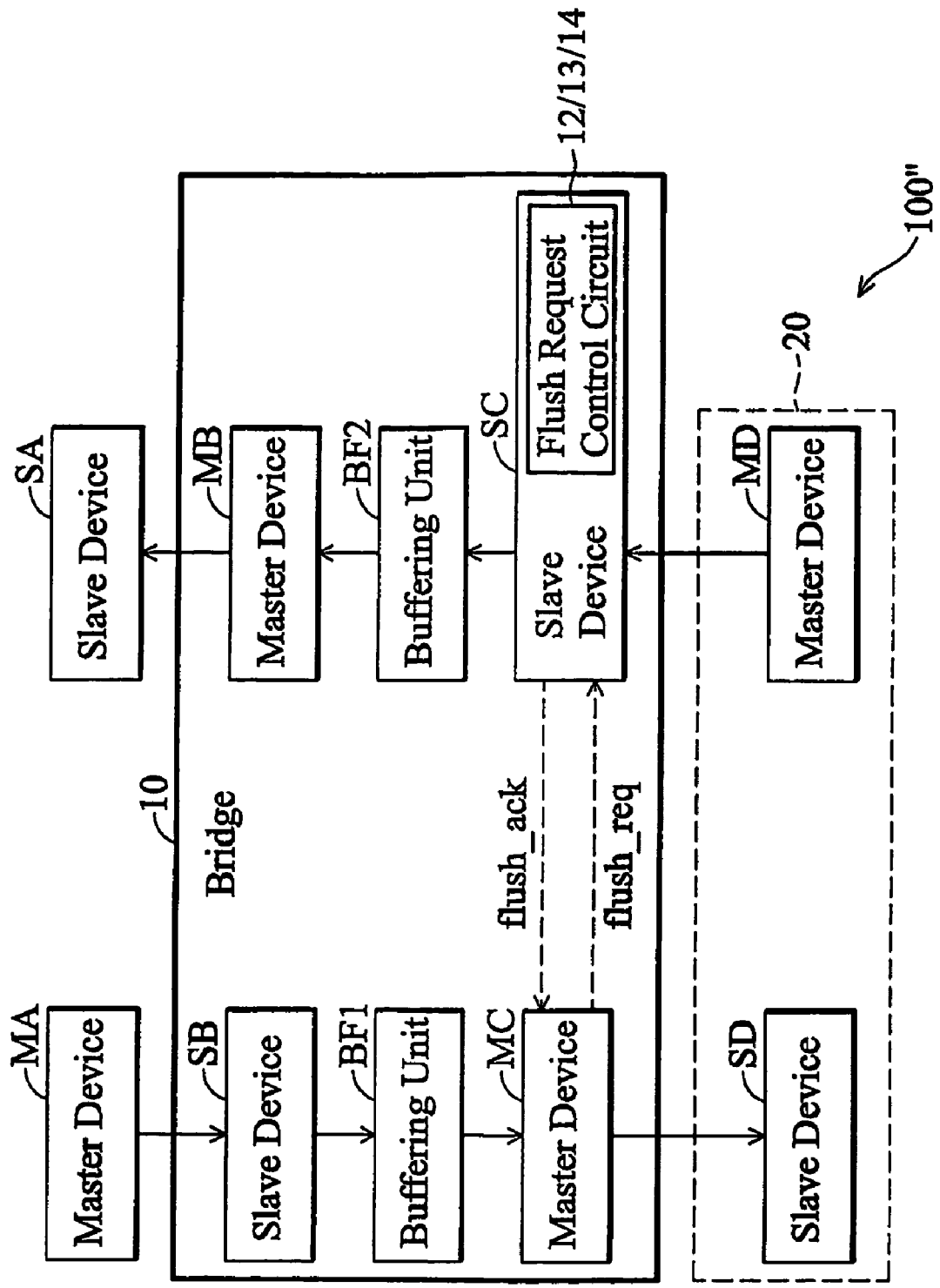
FIG. 7 shows another embodiment of the electronic system.

FIG. 7 shows another embodiment of the electronic system. As shown, the electronic system 100" is similar to the electronic system 100 shown in FIG. 1, wherein the only difference is that the slave device SC in the bridge 10 further comprises the flush request control circuit 12 as shown in FIG. 2. For example, the bridge 10 can be a north bridge chipset, a south bridge chipset or a combination thereof, but is not limited thereto.

When performing a written transaction request, the peripheral device 20 outputs an interrupt signal to the master device MA (such as CPU) to indicate to the slave device SA (such as the system memory) to read (i.e., load) new data. Before processing the loaded data in the slave device SA, the master device MA checks the status of the peripheral device 20. Namely, the master device MA read the status information of the slave device SD, and before such transactions is performed, the bridge 10 must confirm that the loaded data has been pushed into the slave device SA. The bridge 10 provides a flush request to the slave device SC and waits for the slave device SC to reply with a flush acknowledge signal flush_ack representing that the loaded data has been pushed into the slave device SA, before the slave device SD reads new data or returns the loaded data to the master device MA.

When the master device MC asserts the flush request flush_req, the flush request control circuit 12 in the bridge 10 detects whether n buffers in the buffering unit BF2 have been flushed and records the flushed buffers after the flush request has been received. When the n buffers all have been flushed once after the flush request has been received, the flush request control circuit 12 outputs the flush acknowledge signal flush_ack to indicate to the master device MC that data or instructions pushed before receiving the flush request flush_req has/have been read. Hence, even if the flush request flush_req is asserted by the master device MC, the slave device SC does not stop receiving transaction requests from the master device MD in the peripheral device 20 and continues pushing data and/or instructions into the buffering unit BF2, thus improving system performance. In some embodiments, the flush request control circuit 12 can also be disposed in the slave device SB or SD, but is not limited thereto.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A bridge, comprising:
    a buffering unit comprising a plurality of buffers;
    a first master device for outputting a flush request to flush the buffering unit; and
    a flush request control circuit for recording flushed buffers in the buffering unit in response of the flush request from the first master device, and outputting a flush acknowledge signal to indicate to the first master device that the buffering unit has been flushed in response of that all the plurality of buffers have been flushed after the flush request has been received;
    wherein the flush request control circuit comprises:
        a plurality of detection units correspondingly coupled to the plurality of buffers for outputting flush validation signals according to the flushed buffers, respectively; and
        an output unit for generating the flush acknowledge signal when all the detection units output the flush validation signal;
    wherein the detection units each comprise:
        a register for generating a flush signal according to the flush request and an idle signal from a corresponding buffer, to represent that the corresponding buffer has been flushed after the flush request has been received; and
        a processor for generating the flush validation signal according to the flush signal and the idle signal.

2. The bridge as claimed in claim 1, wherein the bridge further receives data or instructions from a slave device after the buffering unit receives the flush request and before the flush request control circuit outputs the flush acknowledge signal.

3. The bridge as claimed in claim 1, wherein the processor comprises:
    an AND gate comprising two input terminals coupled to the flush signal and the flush request, respectively; and
    an OR gate for outputting the flush signal according to an output of the AND gate and the idle signal from the corresponding buffer.

4. The bridge as claimed in claim 1, wherein the buffers detects whether the buffers have been flushed according to the corresponding idle signals.

5. The bridge as claimed in claim 1, wherein the detection units clear all flush signals after the flush request control circuit outputs the flush acknowledge signal.

6. The bridge as claimed in claim 1, wherein registers of the detection units clear all flush signals according to the flush acknowledge signal.

7. A flush request control circuit for generating a flush acknowledge signal representing that all buffers in a buffering unit have been flushed according to a flush request, comprising:
    a plurality of detection units each correspondingly coupled to one of the buffers, in which each of the detection units outputs a flush validation signal according to the flush request and a corresponding idle signal from the corresponding buffer, to represent that the corresponding buffer has been flushed after the flush request has been received; and
    an output unit for generating the flush acknowledge signal when all the detection units output the flush validation signal;
    wherein the detection units each comprise:
        a register generating a flush signal according to the flush request and the corresponding idle signal to represent that the corresponding buffer has been flushed after the flush request has been received; and
        a processing unit generating the flush validation signal according to the flush request and the corresponding idle signal.

8. The flush request control circuit as claimed in claim 7, wherein the processing unit comprises:
    an AND gate comprising two input terminals coupled to the flush request and the flush validation signal respectively; and
    an OR gate outputting the flush acknowledge signal according to an output of the AND gate and the corresponding idle signal from the corresponding buffer.

9. The flush request control circuit as claimed in claim 7, wherein the detection units clear all the flush validation signals after the flush request control circuit outputs the flush acknowledge signal.

10. The flush request control circuit as claimed in claim 7, wherein registers in the detection units clear the flush validation signals according to the flush acknowledge signal.

11. The flush request control circuit as claimed in claim 7, wherein registers in the detection units each comprise:
    an AND gate receiving the flush request and the corresponding idle signal;
    a first multiplexer selectively outputting the flush signal and a logical low signal according to the flush acknowledge signal;
    a second multiplexer selectively outputting an output of the first multiplexer and a logical high signal according to an output of the AND gate; and
    a D-flip flop generating the flush signal according to an output of the second multiplexer.

12. A flush method adapted for flushing a buffering unit comprising a plurality of buffers of an electronic system according to a flush request, comprising:

detecting whether buffers of the buffering unit have been flushed and recording the flushed buffers in response to the flush request from a first master device; and outputting a flush acknowledge signal to the first master device in response that all the buffers of the buffering unit have been flushed after the flush request has been received;

outputting a flush validation signal in response of that a corresponding buffer has been flushed, thereby recording the flushed buffer;

outputting a flush signal according to the flush request and an idle signal from a corresponding buffer, thereby representing that the corresponding buffer has been flushed after the flush request has been received; and generating the flush validation signal according to the flush signal and the idle signal.

13. The flush method as claimed in claim 12, further comprising receiving data or instructions from a first slave device after the flush request has been received and before the flush acknowledge signal is outputted.

14. The flush method as claimed in claim 12, wherein whether the buffering unit is flushed is determined according to the corresponding idle signal.

15. The flush method as claimed in claim 12, further comprising clearing all the flush validation signals after the flush acknowledge signal has been outputted.

* * * * *